US008521435B2

(12) United States Patent
Minh et al.

(10) Patent No.: US 8,521,435 B2
(45) Date of Patent: Aug. 27, 2013

(54) ESTIMATING SIGMA LOG BEYOND THE MEASUREMENTS POINTS

(75) Inventors: Chanh Cao Minh, Katy, TX (US); Marie Laure Mauborgne, Fontenay aux Roses (FR); Roger Griffiths, Schaffhausen (CH); Darwin Ellis, Ridgefield, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 415 days.

(21) Appl. No.: 12/797,182

(22) Filed: Jun. 9, 2010

(65) Prior Publication Data

US 2011/0004408 A1  Jan. 6, 2011

Related U.S. Application Data

(60) Provisional application No. 61/185,658, filed on Jun. 10, 2009.

(51) Int. Cl.
*G01V 9/00* (2006.01)
*G01V 11/00* (2006.01)
*G06F 19/00* (2011.01)
*G06F 17/40* (2006.01)

(52) U.S. Cl.
USPC .... 702/11; 73/152.02; 73/865.8; 166/250.01; 175/50; 702/1; 702/127; 702/187; 702/189; 708/200

(58) Field of Classification Search
USPC .............. 73/152.01, 152.02, 152.03, 152.05, 73/152.43, 152.46, 865.8; 166/244.1, 250.01, 166/250.02; 175/40, 50; 181/101, 102, 105; 250/253, 254; 324/323; 367/14, 25, 81, 367/86; 378/162; 702/1, 2, 6, 7, 8, 9, 11, 702/127, 187, 189; 708/100, 105, 200, 290
See application file for complete search history.

(56) References Cited

U.S. PATENT DOCUMENTS 2,649,163 A * 8/1953 Atkins, Jr. ................. 367/86
2,878,999 A * 3/1959 Lindsey et al. .............. 708/842
(Continued)

FOREIGN PATENT DOCUMENTS

| EP | 1795921 | 6/2007 |
| EP | 2101198 | 9/2009 |
| WO | 2009015252 | 1/2009 |

OTHER PUBLICATIONS

Cao Minh, et al., "Estimation of Variable Fluids Mixture Density with 4D NMR Logging", SPE 109051, presented at the 2007 Annual Technical Conference and Exhibition, Anaheim, California (as republished in part by D. Denney in SPE Journal of Petroleum Technology, Aug. 2008, pp. 59-62).

(Continued)

*Primary Examiner* — Edward Cosimano
(74) *Attorney, Agent, or Firm* — Kenneth Liu; Kimberly Ballew; Brigitte J. Echols

(57) ABSTRACT

The present disclosure relates to a method to determine the capture cross-section of a subsurface formation at a desired depth in the formation. A database of Sigma values for known lithologies, porosities, and salinities is provided, and multiple Sigma measurements are obtained from a downhole logging tool. Within the database, Sigma values are interpolated to determine the respective depths of investigation of the multiple Sigma measurements. A monotonic function is fitted to the multiple Sigma measurements at the determined depths of investigation, and the capture cross-section of the subsurface formation at any desired depth in the formation is determined using the fitted function. Similarly, a system to determine the capture cross-section of a subsurface formation at a desired depth in the formation and/or a depth of invasion of drilling fluids is also disclosed.

16 Claims, 6 Drawing Sheets

(56) References Cited

U.S. PATENT DOCUMENTS

| | | | | |
|---|---|---|---|---|
| 3,412,240 A | * | 11/1968 | Dell et al. | 708/290 |
| 3,518,513 A | * | 6/1970 | Luciano et al. | 318/571 |
| 3,532,864 A | * | 10/1970 | Dertouzos | 708/290 |
| 3,586,858 A | * | 6/1971 | Youmans | 250/259 |
| 3,930,154 A | * | 12/1975 | Scott | 376/160 |
| 4,712,424 A | * | 12/1987 | Herron | 73/152.14 |
| 4,722,220 A | * | 2/1988 | Herron | 73/152.14 |
| 6,944,548 B2 | * | 9/2005 | Radtke et al. | 702/8 |
| 7,432,499 B2 | * | 10/2008 | Edwards et al. | 250/259 |
| 7,532,984 B2 | * | 5/2009 | Syngaevsky | 702/13 |
| 7,888,933 B2 | | 2/2011 | Minh | |
| 8,005,618 B2 | * | 8/2011 | Gzara | 702/7 |
| 2004/0128073 A1 | * | 7/2004 | Radtke et al. | 702/8 |
| 2006/0180754 A1 | * | 8/2006 | Edwards et al. | 250/269.3 |
| 2008/0114547 A1 | * | 5/2008 | Syngaevsky | 702/13 |
| 2009/0177403 A1 | * | 7/2009 | Gzara | 702/7 |
| 2009/0206834 A1 | | 8/2009 | Minh | |
| 2010/0264914 A1 | | 10/2010 | Minh | |
| 2010/0283490 A1 | | 11/2010 | Minh et al. | |
| 2011/0060526 A1 | * | 3/2011 | Faivre et al. | 702/8 |

OTHER PUBLICATIONS

Gyllensten, et al., "Advances in LWD Sigma Measurements and Application to Real-Time Formation Evaluation in Carbonate Reservoirs", SPWLA Annual Logging Symposium, Jun. 21-24, 2009.

Cao Minh, et al., "Estimation of Variable Fluids Mixture Density with 4D NMR Logging", SPE 109051, presented at the 2007 Annual Technical Conference and Exhibition, Anaheim, California.

* cited by examiner

ESTIMATING SIGMA LOG BEYOND THE MEASUREMENTS POINTS

CROSS-REFERENCE TO OTHER APPLICATIONS

This application claims, under 35 U.S.C. 119(e), priority to and the benefit of U.S. Provisional Application No. 61/185,658, filed Jun. 10, 2009.

BACKGROUND

1. Technical Field

The present disclosure relates generally to the logging of subsurface formations surrounding a wellbore using a downhole logging tool, and particularly to using the logs to estimate the capture cross-section at various depths of investigation, and using those estimates to infer one or more formation properties.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have components common to wireline tools (e.g., transmitting and receiving antennas), but MWD and LWD tools must be constructed to not only endure but to operate in the harsh environment of drilling.

It is known how to combine capture cross-section ($\Sigma$ or Sigma) and phase shift resistivity to determine water saturation (Sw) and water salinity. However, $\Sigma$ is a shallow measurement (~9 inches) compared to resistivity (~16 inches). A logging tool such as Schlumberger's ECOSCOPE tool is capable of measuring capture cross section for multiple depths of investigation ranging from about 6 inches to 12 inches into the formation. There is, therefore, a need to estimate $\Sigma$ beyond its deepest DOI, especially when multi-DOI Sigma measurements indicate the presence of invasion. Such an estimate would assist in reducing formation parameter estimate errors due to invasion and/or making the Sigma measurement more compatible with the phase shift resistivity measurement used to determine water saturation and salinity.

SUMMARY

The present disclosure relates to a method to determine the capture cross-section of a subsurface formation at a desired depth in the formation. A database of Sigma values for known lithologies, porosities, and salinities is provided, and multiple Sigma measurements are obtained from a downhole logging tool. Within the database, Sigma values are interpolated to determine the respective depths of investigation of the multiple Sigma measurements. A monotonic function is fitted to the multiple Sigma measurements at the determined depths of investigation, and the capture cross-section of the subsurface formation at any desired depth in the formation is determined using the fitted function. Similarly, a system to determine the capture cross-section of a subsurface formation at a desired depth in the formation and/or a depth of invasion of drilling fluids is also disclosed.

Other aspects and advantages will become apparent from the following description and the attached claims.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
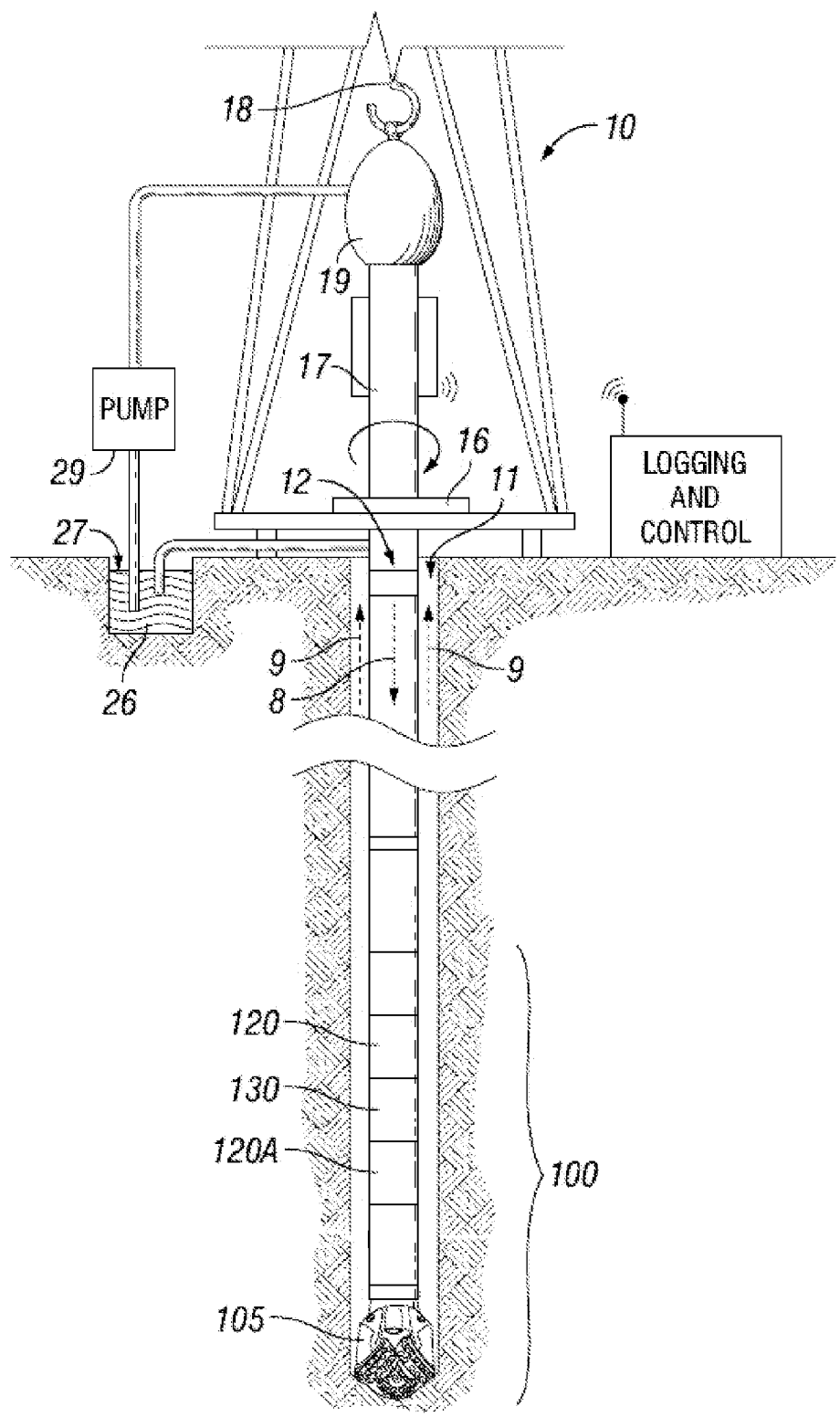
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Figure 2:
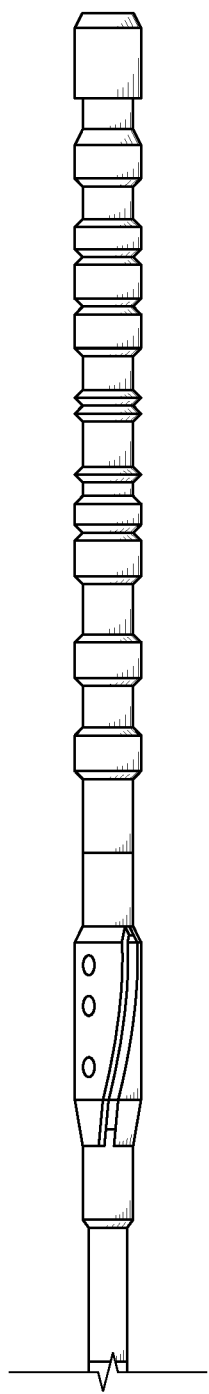
FIG. 2 shows a prior art electromagnetic logging tool.

An example of a tool which can be the LWD tool 120, or can be a part of an LWD tool suite 120A of the system and method hereof, is Schlumberger's ECOSCOPE tool, as seen in FIG. 2.

One can use a database of controlled experiments in known lithology blocks having various porosities that are invaded with various water salinities to determine Sigma at arbitrary depths. In one embodiment, one determines the respective DOIs of a tool's multi-Sigma measurements by interpolating within the database. Then one fits a monotonic function to the measurements points at the determined DOIs. That gives the estimated continuous Sigma radial response to invasion depths, from which Sigma at other DOIs can be estimated. This methodology has some aspects that are similar to those disclosed in U.S. patent application Ser. No. 12/364,104 now U.S. Pat. No. 7,888,933 and pending U.S. patent application Ser. No. 12/669,590 regarding NMR multi-DOI measurements.

Figure 3:
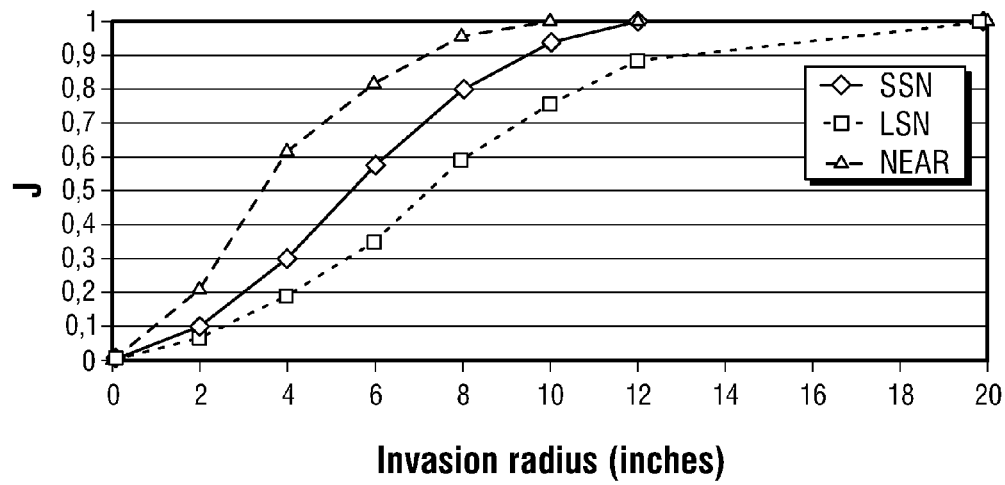
FIG. 3 is a plot showing typical modular multi-DOI Sigma logs response to invasion depths, in accordance with one embodiment in the present disclosure.

FIG. 3 shows a typical experimental result of multi-Σ measurements in invaded formations. The "near" detector of the logging tool measures a shallow Σ measurement relative to the "SSn" detector. The SSn detector makes a medium Σ measurement, while the deepest Σ measurement is provided by the "LSn" detector. The DOIs are usually taken at 90% of the integrated response, or J function, and are highlighted in bold under the column $J_{90}$ in Table 1 below. The example shows that the DOI of the Sigma log is a complicated function of, at least, porosity (20 pu), lithology (limestone), and the invaded/invading salinities (30 k ppm invaded by 200 k ppm).

TABLE 1

20 pu Limestone, 30k ppm formation water invaded by 200k ppm ppm filtrate
$\Sigma_t = 12.2$ c.u. $\Sigma_{xo} = 25.6$ c.u. $\Sigma_{mud} = 100$ c.u.

| Detector | $J_{50}$ | $J_{90}$ |
| --- | --- | --- |
| Near | 2.5 | 7 |
| SSn | 4.5 | 9 |
| LSn | 7 | 12 |

The J-function is calculated as follows:

$$J(x) = \frac{\Sigma(x) - \Sigma(0)}{\Sigma(Inf) - \Sigma(0)} \quad (1)$$

where x is the radius of invasion, and $\Sigma(x)$, $\Sigma(0)$, and $\Sigma(Inf)$ are, respectively, the measured Sigma at x inches of invasion, Sigma without invasion, and Sigma with full invasion. The data are normalized to read $J(0)=0$ when there is no invasion and $J(Inf)=1$ when the formation is fully invaded. $J_{50}$ and $J_{90}$ denote the J-function at 50% and 90%, respectively. The non-exhaustive results are summarized in Table 2 below.

TABLE 2

| Formation (Formation water salinity/mud salinity) | $\Sigma_t$ (c. u.) | $\Sigma_{xo}$ (c. u.) | Near | | SSn | | LSn | |
|---|---|---|---|---|---|---|---|---|
| | | | $J_{50}$ | $J_{90}$ | $J_{50}$ | $J_{90}$ | $J_{50}$ | $J_{90}$ |
| 20 PU Limestone (30 kppm/200 kppm) | 12.2 | 25.6 | 2.5 | 7 | 4.5 | 9.5 | 7 | 13 |
| 20 PU Limestone (50 kppm/200 kppm) | 13.6 | 25.6 | 3.5 | 6 | 5.5 | 10.5 | 7 | 15 |
| 25 PU Limestone (50 kppm/200 kppm) | 15.3 | 30.2 | 3 | 6 | 6 | 12 | 9 | 15 |
| 30 PU Limestone (30 kppm/200 kppm) | 14.7 | 34.8 | 3 | 5.5 | 5.5 | 11 | 8.5 | 14.5 |
| 30 PU Limestone (50 kppm/200 kppm) | 16.9 | 34.8 | 3 | 5.5 | 6.5 | 10.5 | 9.5 | 15 |
| 10 PU Limestone (200 kppm/30 kppm) | 16.3 | 9.6 | 3.5 | 7.5 | 5 | 10 | 6 | 14 |
| 10 PU Limestone (200 kppm/50 kppm) | 16.3 | 10.4 | 3.5 | 7 | 5.5 | 10 | 7.5 | 14 |
| 10 PU Limestone (200 kppm/105 kppm) | 16.7 | 12.4 | 2.5 | 8 | 3 | 10 | 6 | 12 |
| 20 PU Limestone (200 kppm/30 kppm) | 25.6 | 12.2 | 2.5 | 5.5 | 3.5 | 8.5 | 4.5 | 9.5 |
| 20 PU Limestone (200 kppm/50 kppm) | 25.6 | 13.6 | 3 | 6 | 4 | 8 | 5 | 12 |
| 25 PU Limestone (200 kppm/50 kppm) | 30.2 | 15.3 | 2.5 | 6 | 3.5 | 8 | 4.5 | 11 |
| 30 PU Limestone (200 kppm/30 kppm) | 34.8 | 16.9 | 2 | 5 | 3 | 7.5 | 3.5 | 8.5 |
| 30 PU Limestone (200 kppm/50 kppm) | 34.8 | 16.9 | 2 | 6 | 3.5 | 7.5 | 3.8 | 10 |
| 30 PU Limestone (200 kppm/80 kppm) | 34.8 | 20.2 | 2 | 5 | 4 | 7.5 | 6 | 9.5 |
| 30 PU Limestone (200 kppm/105 kppm) | 34.8 | 23.1 | 2.5 | 6 | 3.5 | 8 | 4.5 | 11 |
| 10 PU Sandstone (200 kppm/105 kppm) | 14.0 | 10.1 | 4 | 7.5 | 5 | 9.5 | 5.5 | 12 |
| 20 PU Sandstone (200 kppm/50 kppm) | 23.5 | 11.6 | 3 | 6 | 4 | 8.5 | 4.5 | 12 |
| 30 PU Sandstone (200 kppm/50 kppm) | 33.0 | 15.1 | 2 | 5.5 | 3.5 | 7.5 | 3.7 | 8 |
| 30 PU Sandstone (200 kppm/80 kppm) | 33.0 | 18.4 | 2 | 6 | 3.5 | 7.5 | 4 | 10 |
| 30 PU Sandstone (200 kppm/105 kppm) | 33.0 | 21.3 | 2 | 4 | 4 | 8 | 5 | 10 |

To determine the DOIs of the Sigma log measurements, the database can be re-grouped into, first, a lithology-salinities class, and then by porosity and DOIs, as shown in Table 3 below. The first column is porosity, the second column is the shallow $\Sigma$ DOI, the third column is the medium $\Sigma$ DOI, and the fourth column is the deep $\Sigma$ DOI. The cells from which Table 3 is derived are shaded in gray in Table 2.

TABLE 3

Limestone 200k ppm/50k ppm (Lithology-salinity class)

| Porosity | Shallow $\Sigma$ DOI | Medium $\Sigma$ DOI | Deep $\Sigma$ DOI |
|---|---|---|---|
| 0.1000 | 7.0000 | 10.0000 | 14.0000 |
| 0.2000 | 6.0000 | 8.0000 | 12.0000 |
| 0.2500 | 6.0000 | 8.0000 | 11.0000 |
| 0.3000 | 6.0000 | 7.5000 | 10.0000 |

Thus, at every depth level, one can use the measured porosity to interpolate for the values of $\Sigma$ DOIs for a given class of lithology and invading/invaded salinities. For example, if the porosity is 0.275, one obtains:

| Porosity | Shallow $\Sigma$ DOI | Medium $\Sigma$ DOI | Deep $\Sigma$ DOI |
|---|---|---|---|
| 0.275 | 6.0000 | 7.7500 | 10.5000 |

If the lithology is complex, i.e. mixture of limestone and sandstone, the procedure comprises interpolations within the different limestone/sandstone classes, then combining the results using the respective volumes of limestone and sandstone. If the salinities are unknown, then one might use the nearest salinity case in the database as a starting guess, and then refine the results after determining the "correct" salinity from the Sigma-Resistivity processing.

One can estimate a continuous, radial sigma log profile using the appropriate determined Sigma DOI. The mathematical problem to solve is the estimation of Sigma(r) from the measured Sigmas, at their respective DOIs. The simplest form, corresponding to the case of no annulus invasion, is one of a monotonically increasing, monotonically decreasing, or constant function of the radial distance r. Such a function can be described as a linear combination:

$$\tilde{\Sigma}(r) = aK_R(1,r) + bK_R(2,r) \qquad (2)$$

where $K_R(1,r)$ is a decreasing function of r, and $K_R(2,r)$ is an increasing function of r, each of which can be described according to the following trigonometric expressions:

$$K_R(1, r) = \cos^2 \frac{\pi}{2}\left(\frac{r - r_0}{r_\infty - r_0}\right) \quad (3)$$

$$K_R(2, r) = \sin^2 \frac{\pi}{2}\left(\frac{r - r_0}{r_\infty - r_0}\right).$$

Here, $r_\infty$ and $r_0$ represent the farthest extent of invasion and the shallowest point at which invasion is observed, respectively. Of course, those values are rarely known with any degree of certainty and should be chosen with a knowledge of the measurements, formation, mud, and other database information.

Of course, one can choose a simpler form of the radial function, such as a linear function, in which case Eq. (2) reduces to:

$$S(r) = a + br \quad (4)$$

Then, the problem is to find the coefficients a and b that minimize the norm of the cost function:

$$\min_{a,b} \frac{1}{2} \sum_{j=1}^{3} (\hat{\Sigma}(r) - \Sigma j)^2, \quad (5)$$

where $\hat{\Sigma}(r)$ is the estimated radial profile having the functional form shown in Eq. 2, and $\Sigma J$ is the measured $\Sigma$ at the $j^{th}$ DOI. Thus, a $\Sigma$ value at any DOI can be estimated from the continuous function $\hat{\Sigma}(r)$. That could be, for example, at sixteen inches to be compatible with a sixteen inch phase shift resistivity measurement, at four inches to be compatible with a density measurement, or at two inches to be compatible with an Rxo (invaded or flushed zone resistivity) measurement. One could also estimate $\Sigma_{xo}$ in the flushed zone, or $\Sigma_t$ in the virgin zone, by computing the radial function value at their respective depths of invasion given by the asymptotes. The inflexion point would indicate the invasion depth.

Figure 4A:
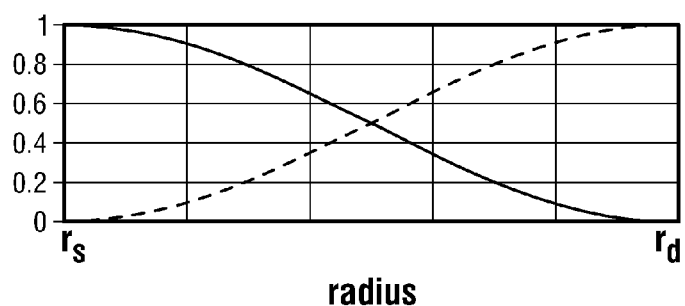
FIGS. 4A and 4B are plots of radially varying functions for different DOIs, in accordance with one embodiment in the present disclosure.
Figure 4B:
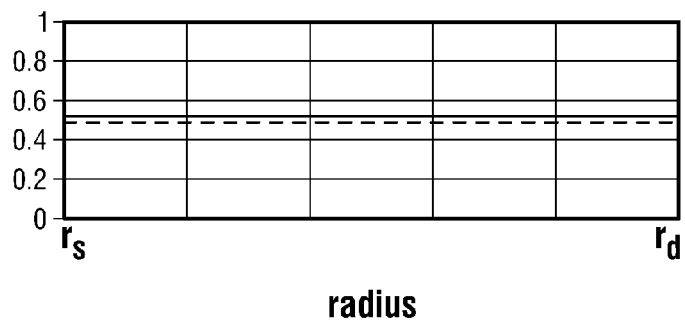

FIGS. 4A and 4B show exemplary solutions that are either: (a) linear combinations of increasing and decreasing functions; or (b) identical and radially flat.

Figure 5A:
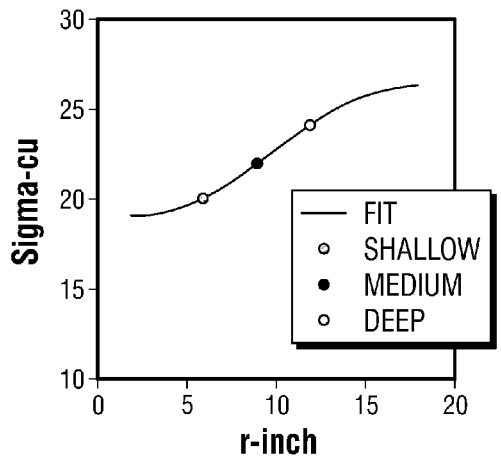
FIGS. 5(a), 5(b), and 5(c) illustrate various synthetic data and fit for the different cases of increasing Sigma, constant Sigma, and decreasing Sigma, respectively, in accordance with one embodiment in the present disclosure.
Figure 5B:
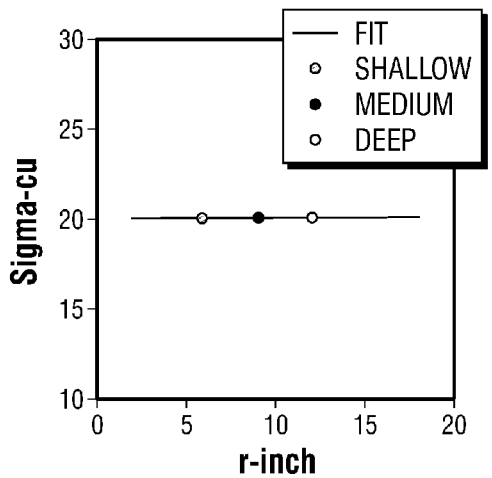
Figure 5C:
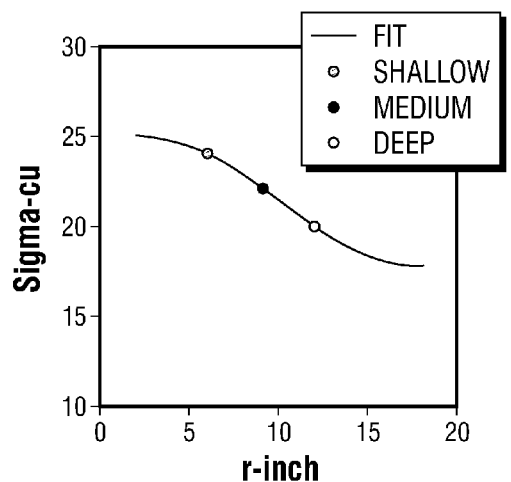
Figure 6:
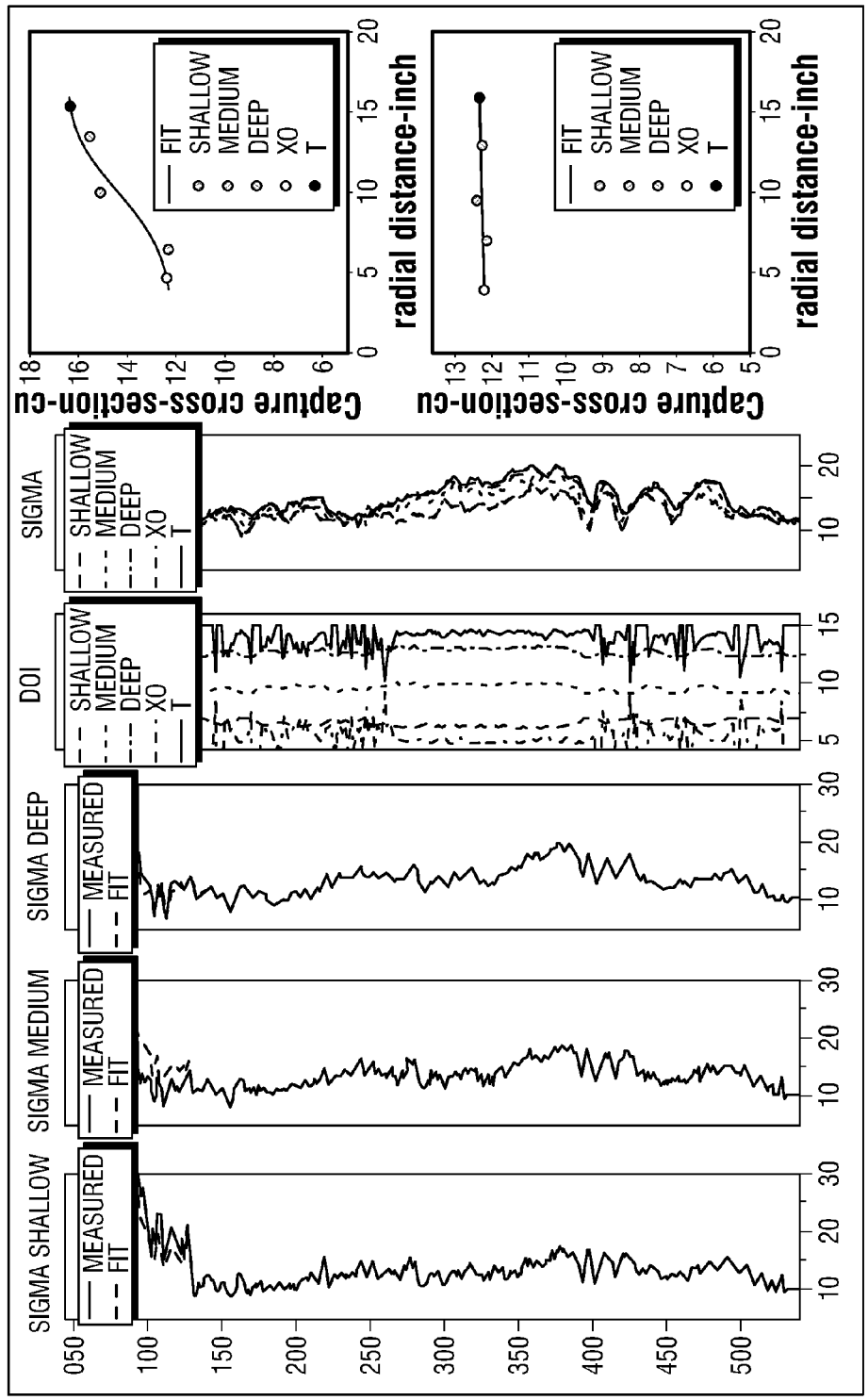
FIG. 6 illustrates an example of multi-DOI Sigma processing results, in accordance with one embodiment of the present disclosure.

FIGS. 5A, 5B, and 5C show an example of synthetic, multi-DOI E data, with their respective curve fits, that represent: in FIG. 5A increasing value with DOI; in FIG. 5B constant value with DOI; and in FIG. 5C decreasing value with DOI. FIG. 6 shows an example of the processing on real data. Track 1 shows the shallow measured $\Sigma$ (solid) and the reconstructed $\Sigma$ (dots). Track 2 shows the medium measured $\Sigma$ (solid) and the reconstructed $\Sigma$ (dots). Track 3 shows the deep measured $\Sigma$ (solid) and the reconstructed $\Sigma$ (dots). Track 4 shows the respective DOIs of the measured $\Sigma$'s estimated from the database and the DOIs of $\Sigma_{xo}$ and $\Sigma_t$. Track 5 shows shallow $\Sigma$, medium $\Sigma$, deep $\Sigma$, $\Sigma_t$, and $\Sigma_{xo}$. Invasion is indicated by the separation of the curves at 350-400 m. Track 6 shows the estimated $\Sigma$ radial profiles at 200 m (no invasion) and 375 m (invasion), as well as the measured $\Sigma$'s, $\Sigma_{xo}$, and $\Sigma_t$.

In addition to estimating the capture cross-section, one can use the above nuclear-based measurements to estimate invasion depth. This is particularly useful in oil-based mud for which the flushed-zone resistivity is not always available.

Figure 7:
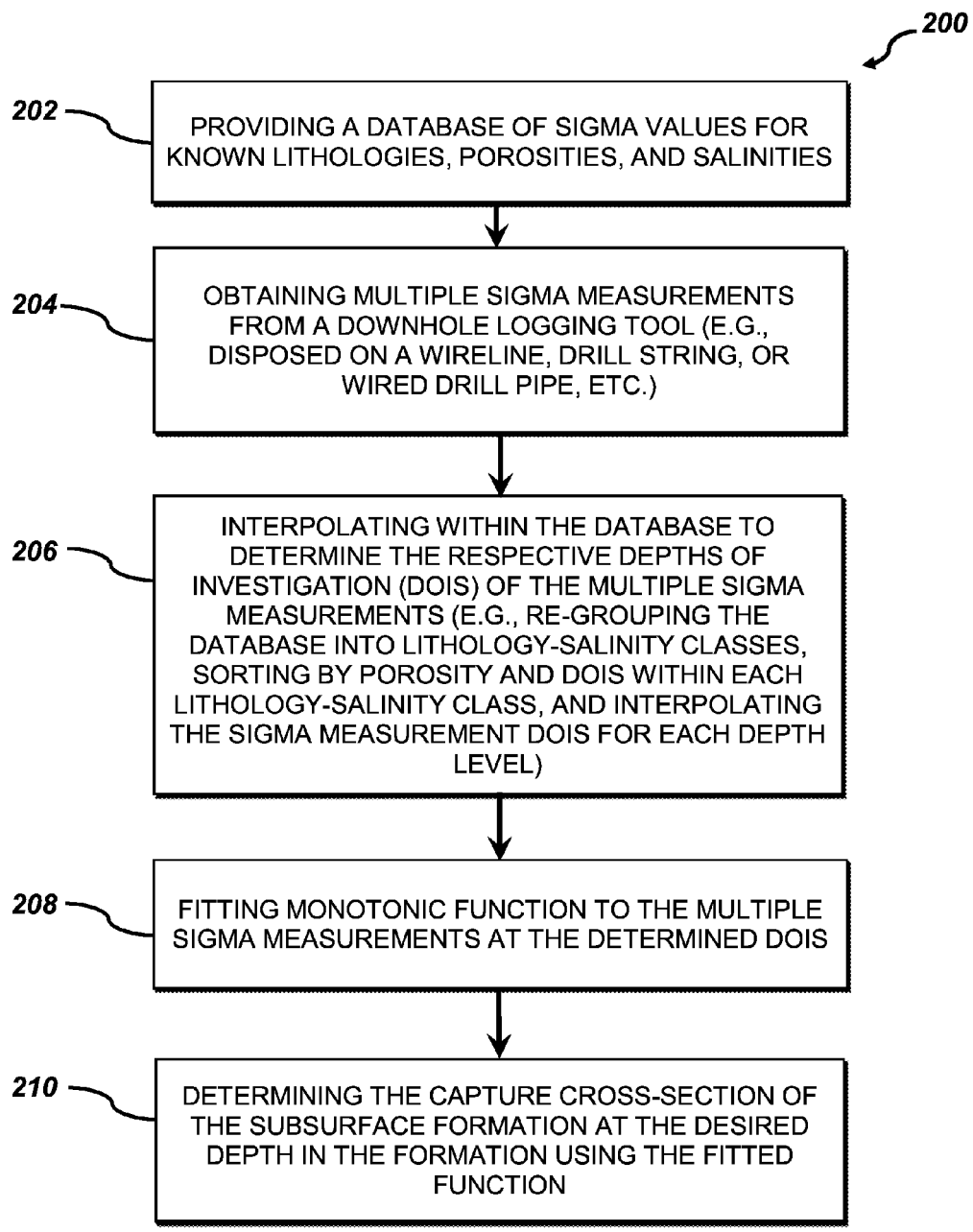
FIG. 7 illustrates a method for determining the capture cross-section of a subsurface formation at a desired depth of formation, the method being performable by a processor in conjunction with a downhole logging tool in accordance with one embodiment of the present invention.

FIG. 7 is a flow chart showing a process 200 for determining a capture cross-section of a subsurface formation at a desired depth in a formation, in accordance with the techniques described above. The process 200, at step 202, includes providing a database of Sigma values for known lithologies, porosities, and salinities. In one embodiment, step 202 may include population of such a database using a processor of a well site system (FIG. 1) that includes a logging tool (FIG. 2). At step 204, the process 200 includes obtaining multiple Sigma measurements from a downhole logging tool. In certain embodiments, such a tool may be disposed on a wireline, drill string, or a wired drill pipe for example.

Thereafter, at step 206, the process 200 includes interpolating within the database to determine the respective depths of investigation (DOIs) of the multiple sigma measurements. In one example embodiment, step 206 may include the sub-steps of re-grouping the database into lithology-salinity classes, sorting within each lithology-salinity class by porosity and DOIs, and interpolating the Sigma measurement DOIs for each depth level. Next, at step 208, the process 200 includes fitting a monotonic function to the multiple Sigma measurements at the determined DOIs from step 206. Finally, the process 200 includes, as shown at step 210, determining the capture cross-section of the subsurface formation at the desired depth in the formation using the fitted function.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine the capture cross-section of a subsurface formation at a desired depth in the formation, comprising:
   providing a database of Sigma values for known lithologies, porosities, and salinities;
   obtaining multiple Sigma measurements from a downhole logging tool;
   interpolating within the database to determine the respective depths of investigation of the multiple Sigma measurements;
   fitting a monotonic function to the multiple Sigma measurements at the determined depths of investigation; and
   determining the capture cross-section of the subsurface formation at the desired depth in the formation using the fitted function.

2. The method of claim 1, wherein the Sigma values relate to various depths in the formation.

3. The method of claim 1, wherein the Sigma measurement depths of investigation are taken at ninety percent of an integrated response function.

4. The method of claim 1, further comprising estimating a depth of invasion.

5. The method of claim 1, wherein the determining the Sigma measurement depths of investigation comprises: re-grouping the database into lithology-salinity classes; sorting, within each lithology-salinity class, by porosity and depths of investigation; and interpolating the Sigma measurement depths of investigation for each depth level.

6. The method of claim 5, further comprising, for mixed lithologies, combining the interpolated Sigma measurement depths of investigations in proportion to the volumes of the different lithologies.

7. The method of claim 1, further comprising estimating a radial Sigma log profile using the determined Sigma depths of investigation.

8. The method of claim 7, wherein the Sigma log profile is one of a monotonically increasing function, a monotonically decreasing function, and a constant function.

9. The method of claim 7, wherein the Sigma log profile is a linear combination of a decreasing function and an increasing function.

10. The method of claim 9, wherein the decreasing function and the increasing function are each described by respective trigonometric functions.

11. The method of claim 7, wherein the Sigma log profile is a function.

12. The method of claim 11, wherein the function has coefficients that minimize the norm of a cost function.

13. A system to determine the capture cross-section of a subsurface formation at a desired depth in the formation, comprising:
   a downhole logging tool capable of making multiple Sigma measurements at various depths of investigation; and
   a processor capable of:
      populating a database of Sigma values for known lithologies, porosities, and salinities;
      interpolating within the database to determine the respective depths of investigation of the multiple Sigma measurements;
      fitting a monotonic function to the multiple Sigma measurements at the determined depths of investigation; and
      determining the capture cross-section of the subsurface formation at the desired depth in the formation using the fitted function.

14. The system of claim 13, wherein the logging tool is disposed on a wireline, a drill string, or a wired drill pipe.

15. The system of claim 13, wherein the processor can estimate a depth of invasion.

16. A system having a computer-readable medium having a set of computer-readable instructions encoded thereon that, when executed, perform acts comprising:
   populating a database of Sigma values for known lithologies, porosities, and salinities;
   obtaining multiple Sigma measurements from a downhole logging tool;
   interpolating within the database to determine the respective depths of investigation of multiple Sigma measurements;
   fitting a monotonic function to the multiple Sigma measurements at the determined depths of investigation; and
   determining the capture cross-section of the subsurface formation at the desired depth in the formation using the fitted function.

* * * * *